June 15, 1965 P. M. KINTNER 3,189,755
CONTROL MODULES AND CIRCUITS
Filed Oct. 9, 1961 13 Sheets-Sheet 1

INVENTOR
Paul M. Kintner
BY
ATTORNEYS

June 15, 1965　　　　　P. M. KINTNER　　　　　3,189,755
CONTROL MODULES AND CIRCUITS
Filed Oct. 9, 1961　　　　　　　　　　　　　　　　13 Sheets-Sheet 2

INVENTOR
Paul M. Kintner
BY
ATTORNEYS

June 15, 1965 P. M. KINTNER 3,189,755
CONTROL MODULES AND CIRCUITS
Filed Oct. 9, 1961 13 Sheets-Sheet 3

INVENTOR
Paul M. Kintner
BY
ATTORNEYS

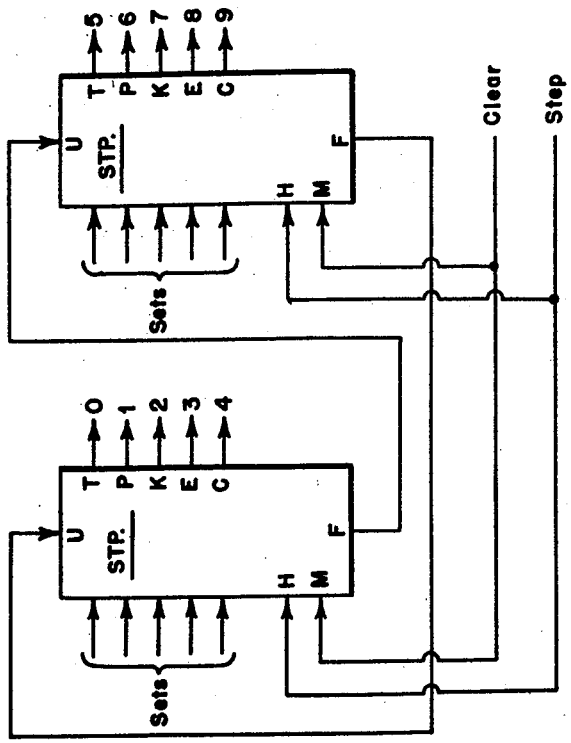
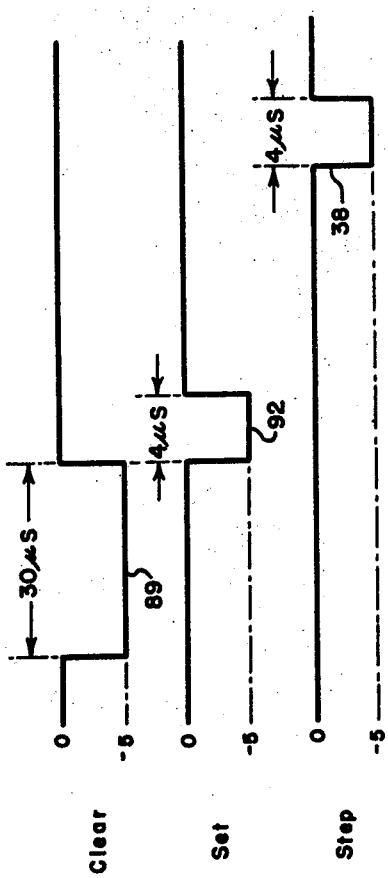
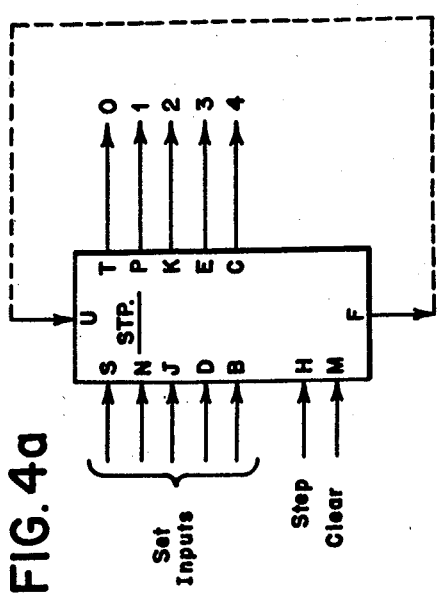
FIG.5
FIG.4a
FIG.4b
INVENTOR
Paul M. Kintner

June 15, 1965 P. M. KINTNER 3,189,755
CONTROL MODULES AND CIRCUITS
Filed Oct. 9, 1961 13 Sheets-Sheet 7

INVENTOR
Paul M. Kintner
BY
ATTORNEYS

June 15, 1965  P. M. KINTNER  3,189,755
CONTROL MODULES AND CIRCUITS
Filed Oct. 9, 1961  13 Sheets-Sheet 8

INVENTOR
Paul M. Kintner
BY
ATTORNEYS

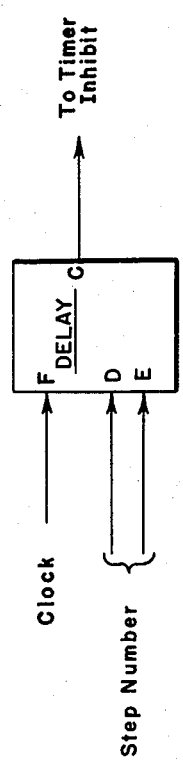
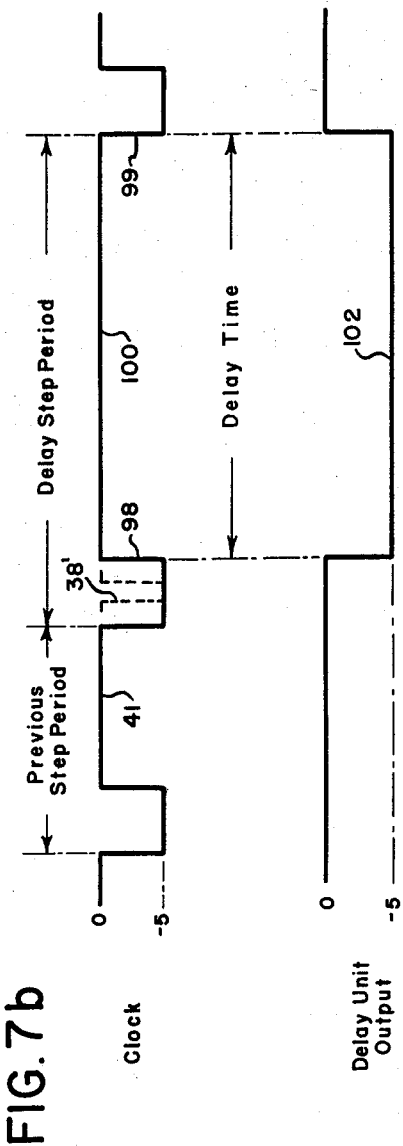
FIG. 7a
FIG. 7b

June 15, 1965 P. M. KINTNER 3,189,755
CONTROL MODULES AND CIRCUITS
Filed Oct. 9, 1961 13 Sheets-Sheet 12

INVENTOR
Paul M. Kintner
BY
ATTORNEYS

United States Patent Office 3,189,755
Patented June 15, 1965

3,189,755
CONTROL MODULES AND CIRCUITS
Paul M. Kintner, Huntington Station, N.Y., assignor to Cutler-Hammer, Inc., Milwaukee, Wis., a corporation of Delaware
Filed Oct. 9, 1961, Ser. No. 143,925
16 Claims. (Cl. 307—88.5)

This invention relates to control modules, and to control circuits formed thereof.

Many control circuits are used in industry at the present time to control machines, computer readout, data processing, etc. Although individualized control circuits may be designed to meet the requirements of each application, and an individual unit constructed, in general this requires considerable development time and entails a considerable manufacturing expense.

It is a primary object of the present invention to provide a series of digital control modules which may be interconnected to meet the requirements of many different types of control applications. By the use of modules, which may be standardized for quantity production, much of the design and manufacturing expense of an individual installation is avoided.

The modular system in accordance with the invention is based on the concept that most control actions may be separated into a series of steps to be performed in succession. At each step one or more control operations may be actuated. The control operation may usually be effected by a switching action, such as closing a relay, starting a motor, gating or shifting a register, incrementing a counter, etc.

A simple series of sequential steps, with control instrumentation at each step, may result in an unduly elaborate system in situations where two or more steps are repeated in obtaining the overall control. Further, the overall operation may involve conditional factors where at some point in the control the subsequent step sequence depends on the effect previously obtained.

Part of the concept is therefore to provide a modular system wherein any desired step sequence can be obtained, including repeating a certain step or steps and jumping to steps out of normal sequence, so that the requirements of any particular application can be met. The repeating or jump actions may be predetermined to occur at desired points in the control cycle, or made conditional on the accomplishment of a particular result, etc.

In a given application some steps may be performed very rapidly, while others may require a longer time. For example, when electronic devices are to be switched from one condition to another at given steps, the switching may be capable of being performed very quickly. However, when a mechanical device such as a relay must be actuated, or a mechanical element moved, more time may be required. Further, in many industrial applications a series of control steps may be performed, and then it may be necessary to await the outcome of that series of steps before performing additional steps.

In the modular system of the present invention basic Timer and Stepper modules are provided for performing a sequence of steps in regular order at a desired speed. The time allowed for each step before proceeding to the next may be selected as desired.

In order to allow steps to be repeated, or to be performed out of the regular progressive step sequence, a Jump module is provided which is operable at any desired step to jump to another step. The jump may be to either a succeeding or preceding step. In the latter case, a series of steps will be repeated until the jump is inhibited to allow stepping to proceed. The inhibition may be effected after a desired number of jumps, or made conditional upon some other action taking place, etc.

A Delay module is provided which can delay the progressive stepping at any desired step, so as to allow time for the completion of the corresponding control function before proceeding to the next step. The delay is usually a fixed time delay which is selected as desired.

A Wait module is provided which is actuable at any desired step so as to stop operation until a Go Ahead signal is received.

In general, the delay, wait and jump actions are controlled by the stepper unit so as to perform the respective action at the desired step. The jump unit then functions to change the stepper to a preceding or a subsequent step as required. The delay and wait units perform their corresponding functions by stopping the timer for the desired intervals.

In passing through a series of steps, whether in normal step sequence or in a sequence involving jumps, there are transition periods between steps which, although short, may result in improper functioning. Accordingly, the timer is arranged to deliver clock pulses which lie between the stepping pulses, and these clock pulses are used as required to insure proper operation of the various units. They are commonly applied to jump, delay and wait modular units in order to allow sufficient time for a step to take place before the control of the unit by that step is effective.

The timer is arranged for manual stepping, if desired, so that a step-by-step advance can be effected for checkout and maintenance purposes.

Some kinds of control may not require all the actions described above. In such case, the modules corresponding to the unneeded actions need not be employed. Also, some types of control may require actions in addition to those described, in which case individual circuits may be designed for that particular application, or additional modules developed if the need warrants.

In the modules themselves, transistor and semiconductor diode circuits are employed for reliability, low power consumption, and general convenience of use. Particular features have been introduced in the various modules which are believed advantageous. However, in the broader aspects of the invention many modifications in individual modular units are possible.

The invention will be explained in conjunction with specific embodiments thereof, including specific modular units and control circuits employing the modular units.

In the drawings:

FIGS. 4, 4a and 4b show a circuit diagram, symbol and waveforms of a Stepper module;

FIG. 5 shows the interconnection of two stepper modules to give a greater number of steps;

FIGS. 6, 6a and 6b show a circuit diagram, symbol and waveforms of a Jump modular unit;

FIGS. 7, 7a and 7b are similar illustrations for a Delay modular unit;

Figure 1:
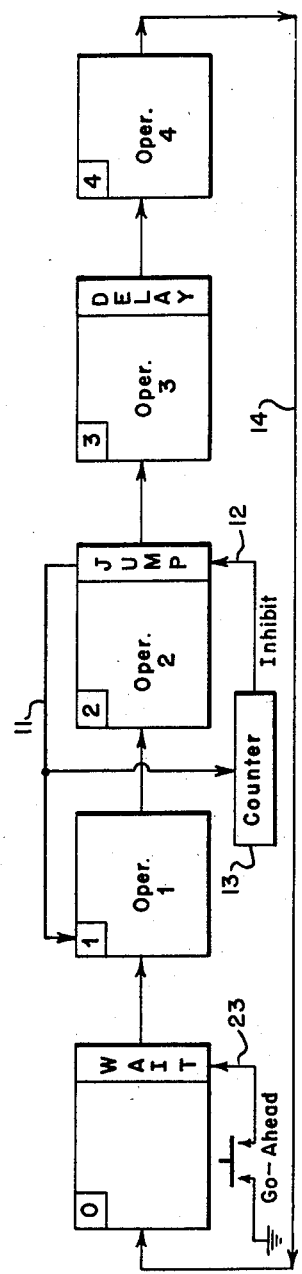
FIG. 1 is a step diagram illustrating a modular arrangement for performing certain operations in a particular sequence.

Referring now to FIG. 1, a step diagram is shown for performing four control operations in sequence, with a repetition of operations 1 and 2 prior to proceeding with operation 3.

Five blocks are shown with the numerals 0 to 4 in the upper left-hand corners to indicate the step numbers. The timer is not shown explicitly, but is assumed to control a stepper giving step outputs performing the indicated functions.

At the 0 step it is desired to wait until a go-ahead signal is received, as indicated. The go-ahead signal may be produced manually or automatically depending upon the application. At step 1, operation 1 is performed, which may be any type of control desired. At step 2, operation 2 is performed. It is then desired to repeat operations 1 and 2, and accordingly a jump unit is actuated at step 2 so that, after operation 2 has been performed, the control unit steps back to operation 1. This is indicated by connection 11 from the jump portion of step 2 back to step 1. This repeat action may be terminated by an inhibiting signal applied through line 12 to the jump unit. In this embodiment it is assumed that the repeat is to be terminated after a selected number of jumps. Accordingly, a counter 13 is provided to count the number of jumps, and the inhibiting signal is applied to line 12 after the desired number of repeats has been performed. In other embodiments it may be desired to repeat the jump until a desired result has been obtained and a corresponding signal then produced to inhibit further jumps.

After the jump is inhibited, the control unit proceeds to step 3 and operation 3 is performed. It is assumed that a time exceeding the normal interval between steps is required for operation 3, and accordingly a delay is produced as indicated. After the delay, the system steps to step 4 and operation 4 is performed.

It is then assumed that the control system is to return to its initial condition, ready for another control operation. Accordingly, the system steps back to the 0 step as indicated by line 14.

Figure 2:
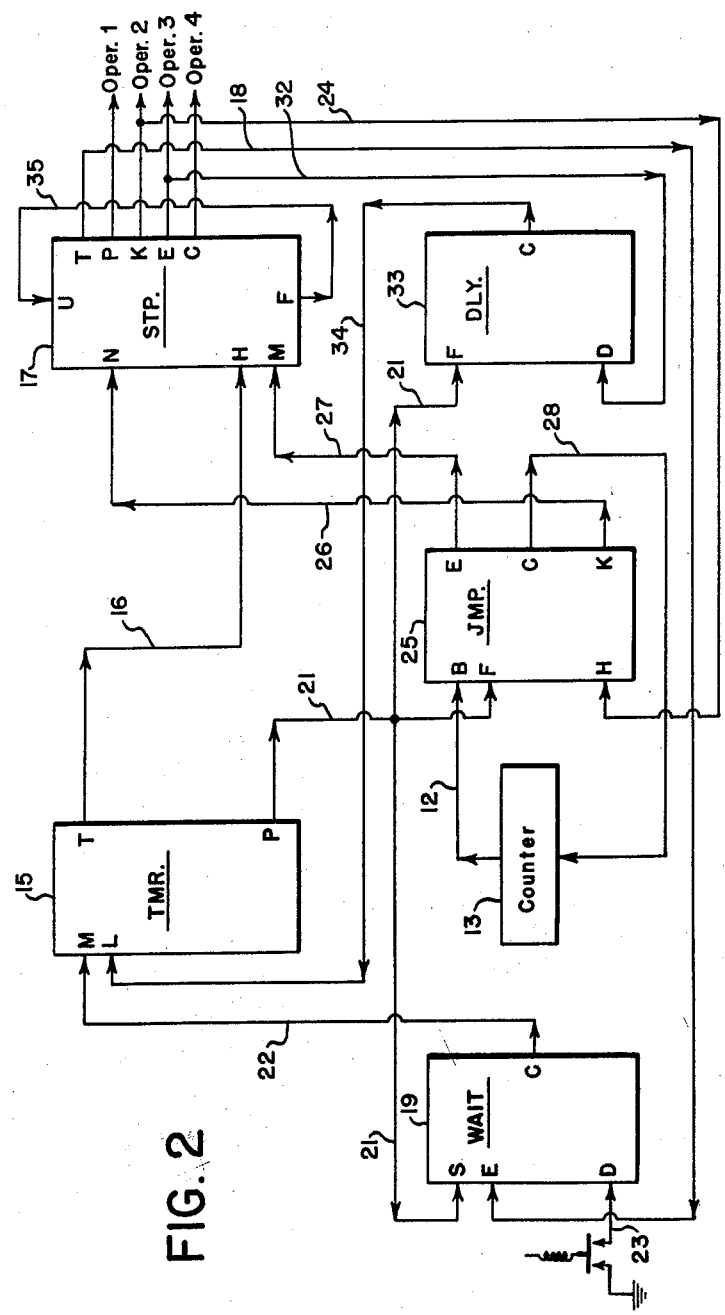
FIG. 2 shows module units interconnected to perform the step sequence of FIG. 1.

Referring to FIG. 2, interconnections between timer, stepper, wait, jump and delay units are shown for effecting the control operation depicted in FIG. 1. The symbols for the several units are shown hereinafter in connection with the circuit diagrams, and the detailed manner in which these circuits function will be understood therefrom. For the moment, it suffices to point out the overall functioning of the control circuit.

Stepping pulses are applied from Timer 15 through line 16 to Stepper 17 to cause the latter to make one step for each step pulse. Steps 0 through 4 give outputs at terminals T, P, K, E, C, in succession. No external operation is required to be performed at step 0, this step being used at a rest step awaiting initial action. For the remaining steps, outputs are shown indicating the corresponding operations. These outputs are in the form of voltage (or current) pulses which may be utilized to perform the required operations. If the operations are electronic, as by electronic switches, gates, etc., the voltages may be utilized directly to effect the necessary control. Or, they may be supplied to switches, relays, etc., as appropriate for the desired operations.

At step 0 it is desired to wait until a go-ahead signal is received. Accordingly, the T output is supplied through line 18 to Wait unit 19. Clock pulses are also supplied from timer 15 through line 21 to the wait unit, and upon the occurrence of the clock pulse an inhibit signal is supplied through line 22 which stops the operation of timer 15. This continues until a go-ahead signal is supplied through line 23 to the Wait unit, terminating the inhibiting signal in line 22. The timer thereupon resumes operation and the stepper 17 moves to step 1, yielding an output from P to perform operation 1.

The next step pulse moves stepper 17 to step 2, giving an output at K to perform operation 2. The output is also supplied through line 24 to the Jump unit 25. This unit is also supplied with clock pulses from line 21, and upon the occurrence of the clock pulse a signal is supplied from output K through line 26 to stepper input N, corresponding to step 1. Accordingly the stepper is stepped back to step 1 as required by the diagram of FIG. 1. Actually, as will appear from the description given hereafter, in setting a new step into the stepper unit, the condition thereof is first cleared and then changed to the desired step. The clear signal is supplied from jump output E through line 27 to stepper input M, and the signal in line 26 then sets the stepper to step 1.

Output C of jump unit 25 gives a pulse for each jump, and these are supplied through line 28 to counter 13. When the counter has counted the necessary number of jumps, an inhibiting signal is supplied through line 12 to jump input B. Accordingly, the jump is discontinued and the stepper moves to step 3 when the next step pulse is received from line 16.

At this step a signal through line 32 is supplied to Delay unit 33. Upon the occurrence of a clock pulse through line 21, an inhibiting signal is supplied from Delay 33 through line 34 to timer input L, and stops the action of the timer. The delay unit is designed to provide a fixed delay whose duration may be selected as required, and upon termination of this delay the timer resumes operation to cause stepper 17 to move to step 4.

This completes the series of operations illustrated in FIG. 1, and the operation is to return to step 0, ready for another go-ahead signal. A jump unit could be used to jump from step 4 to step 0. However, in the embodiment described the stepper 17 is designed to give steps 0 through 4 and a connection from stepper output F to input U through line 35 causes the stepper to return to the 0 step, whereupon the wait unit is actuated by a pulse through line 18 and the initial condition is obtained.

Figure 3:
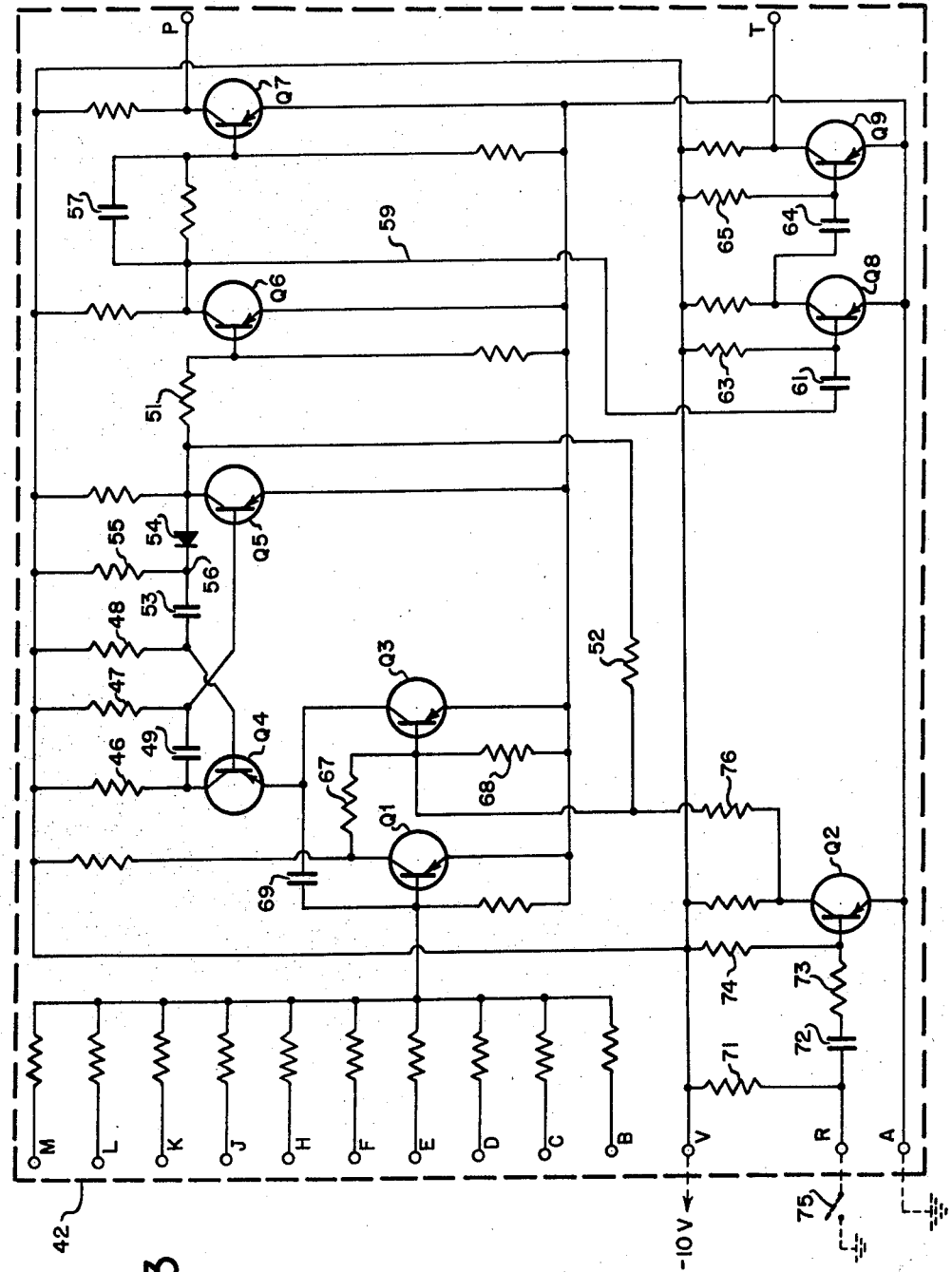
FIGS. 3, 3a, 3b and 3c show a circuit diagram, symbol and waveforms of a Timer module.
Figure 3A:
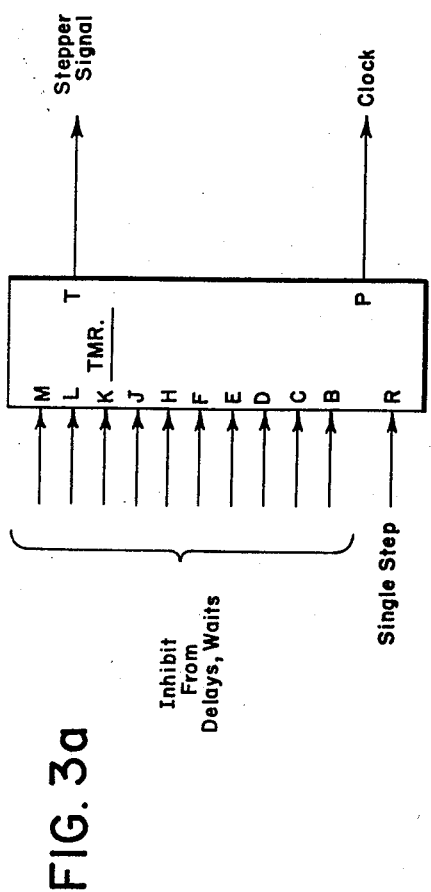

FIG. 3 is a circuit diagram of a timer module. From the symbol shown in FIG. 3a, it will be seen that the timer functions to generate a stepper signal at output T and a clock signal at output P. A number of inhibiting input circuits are supplied, lettered M, L, etc., as indicated. Also, a single step input can be applied at R which inhibits the automatic generation of the stepping and clock signals, and allows the timer to be stepped from one step to the next manually. This is useful for checkout and maintenance purposes.

Figure 3B:
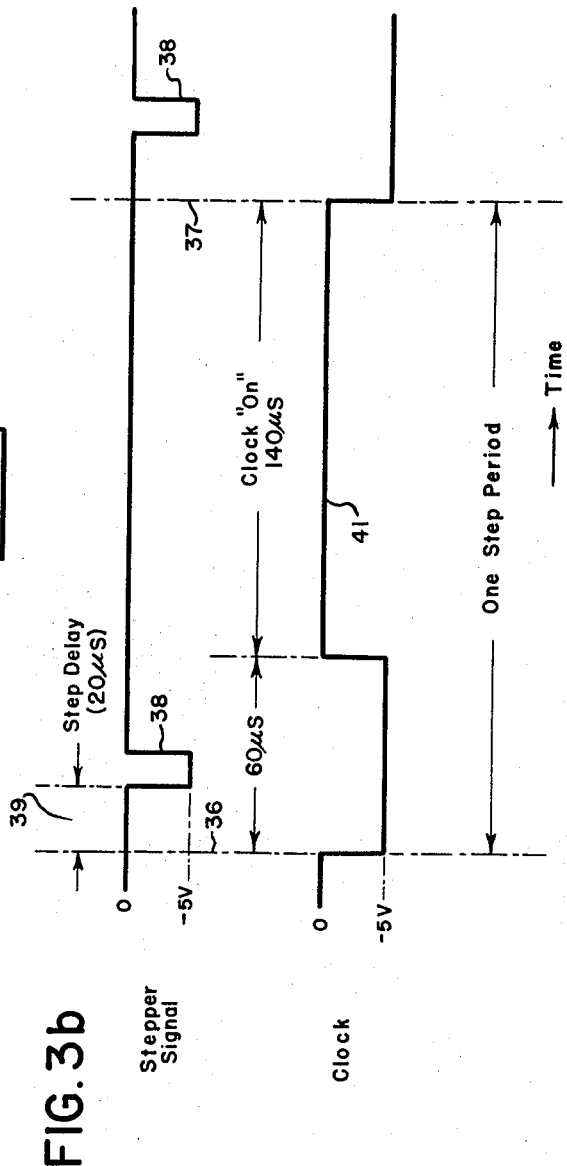

FIG. 3b illustrates the stepping and clock sequence. The time from line 36 to line 37 is designated the step period. This may be selected as desired for a required fundamental or free-running speed of operation. It is here assumed to be 200 microseconds corresponding to a basic speed of operation of 5,000 steps per second. Numerical values will often be given hereinafter to facilitate understanding, but it will be understood that the values may be changed as required to meet the conditions of the particular application.

The stepper signal consists of relatively short negative pulses 38 which recur at the step interval period. As shown, there is a delay 39 from the beginning of a step period to the step pulse which insures that the clock pulse has gone off throughout the whole system before the step is made. After an additional delay to insure that the new step value has stabilized throughout the system, the clock pulse 41 is initiated. This is a positive-going pulse terminating at the end of the step period. In the circuits described hereinafter, switching is from a negative voltage to ground and vice versa. However, the magnitude and polarity of the signals may be selected to conform to the detailed circuit design.

Referring now to FIG. 3, the timer module board is shown by the dashed box 42. Clock and stepper outputs are produced at output terminals P and T, a plurality of input inhibiting circuits B, C . . . L, M are provided, and a single step input R. Terminals A and V are for connection to the power supply. PNP transistors are used in this embodiment, as indicated by the direction of the emitter arrows. Normally A is grounded as indicated in dotted lines, and V is connected to a minus voltage, for example −10 volts. This will be assumed hereinafter for convenience of explanation. However, if desired A could be connected to the plus side of the power supply, and the minus side connected to V and grounded, etc., as will be understood by those in the art.

Transistors Q4 and Q5 are connected as a multivibrator which, acting as an oscillator, generates the basic timing signals. Q3 acts as a switch which, if open, will stop the multivibrator. Q1 is an inverter which accepts the inhibit inputs and generates the control signal for Q3. Q6 and Q7 form a two-stage amplifier for the clock signal. Q8 and Q9 are pulse generators forming the stepper pulse output. Q2 is a pulse generator accepting, say, a contact closure from a grounded switch, as shown, and the output thereof is applied to Q3 to turn that transistor on for the duration of a single step cycle.

Figure 3C:
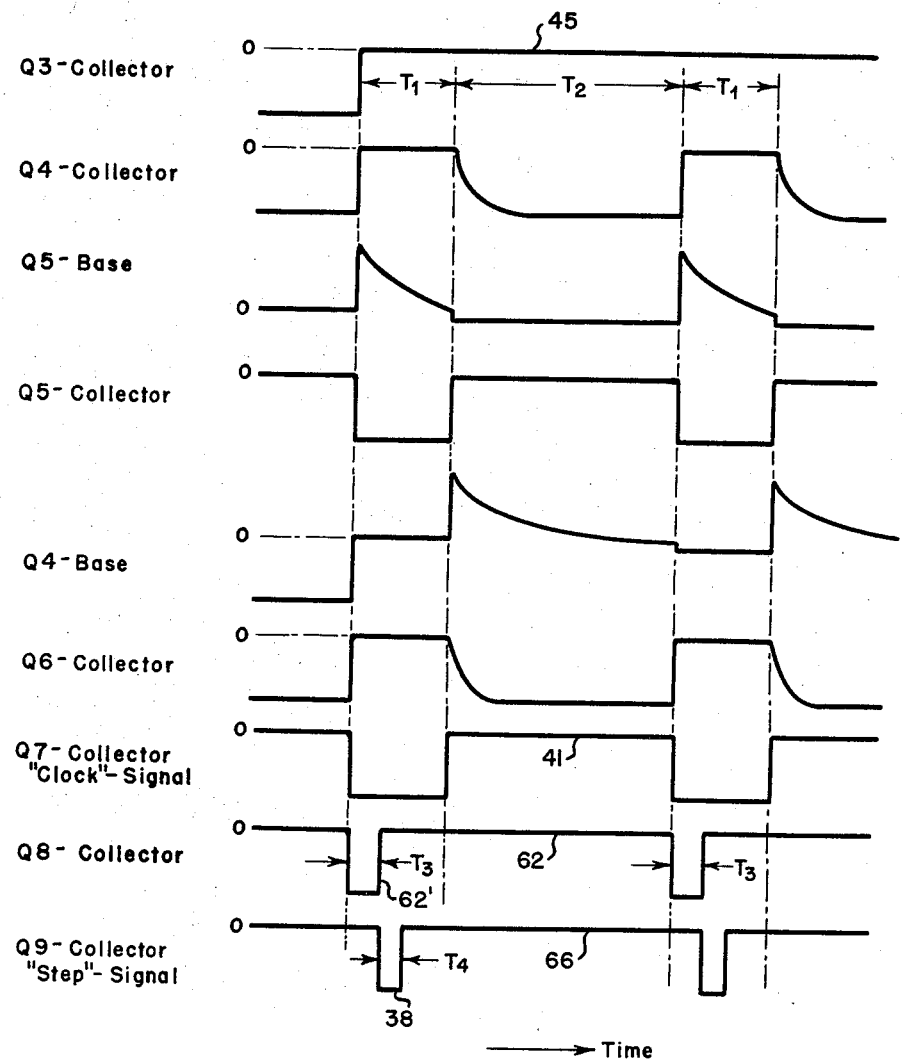

The basic waveforms for the timer circuit of FIG. 3 are shown in FIG. 3c. Assume that Q3 is off (nonconducting), and goes on (conducting) at the beginning of a step period. The collector of Q3 will then change from a negative potential to ground as shown by waveform 45. Previous to Q3 going on, the path from the emitter of Q4 to ground will be open, no current can flow through Q4, and the Q4 collector will be negative, since it is connected to —V through load resistor 46. On the other hand, Q5 will be on through the base current supplied by resistor 47, and the collector of Q5 will be at substantially ground potential since the emitter is connected to A.

A ground return will be supplied to Q4 when Q3 is turned on, and the collector of Q4 will be driven to ground by the control current supplied through resistor 48 to the base. A positive-going transient will be coupled through capacitor 49 to the base of Q5, turning Q5 off and starting astable multivibrator action. The collector of Q5 will go negative to a point limited substantially by the load represented by resistor 51 and resistor 52. However, there will be no loading of capacitor 53 because the diode 54 will furnish a disconnect action.

At the instant of disconnect, the current through resistor 55, previously going through diode 54 and Q5, will be coupled through capacitor 53 to the base of Q4, reinforcing the current from resistor 48. After a period of time $T_1$, shown in FIG. 3c, capacitor 49 will charge sufficiently so that a positive voltage will no longer be applied to the base of Q5, and Q5 will be turned on again by the current through resistor 47. The collector of Q5 will be driven to ground, and in the process will "pick up" the junction 56 through diode 54. A positive transient will be coupled through capacitor 53 to Q4, turning Q4 off. The collector of Q4 will go negative, coupling a negative transient through capacitor 49 to the base of Q5.

After a period of time $T_2$, the positive transient coupled through capacitor 53 will decay until the base of Q4 is no longer positive. Q4 will then be turned on again, and the cycle of action repeated.

The Q5 collector signal is sent through two stages Q6 and Q7 which function as inverting amplifiers. Capacitor 57 is included in the coupling between the stages in order to give a short rise time for the output signal, from the Q7 collector. The waveforms given in FIG. 3c illustrate the above-described operation, and it will be observed that the clock signal at the Q7 collector, and appearing at output terminal P, corresponds to that shown at 41 in FIG. 3b.

In order to produce the stepper signal in proper timed relationship to the clock signal, the collector of Q6 is connected through line 59 and capacitor 61 to the base of Q8. Q8 is a pulse generator which provides a delay $T_3$ as shown by waveform 62 in FIG. 3c, before the step pulse is generated by Q9. This delay allows time between the going off of the clock signal and the production of the next stepping signal which changes the system to a new step. This allowance is desirable because the clock signal may be transmitted throughout the system by means of logic units or amplifiers, and delays will commonly be encountered in these units.

Describing the pulse generator action of Q8, the base of Q8 is connected through resistor 63 to —V. When the collector output of Q6 in line 59 goes positive at the beginning of $T_1$, a positive voltage will be applied to the base of Q8, Q8 will be cut off, and its collector will go negative. Capacitor 61 will then charge through resistor 63 toward the negative potential of —V, and after an interval determined by the circuit time constant, the base of Q8 will go negative and turn Q8 on. This terminates the pulse at the Q8 collector as indicated at 62' in waveform 62.

The positive-going trailing edge of pulse 62' will initiate a negative pulse at the collector output of Q9. This will persist until capacitor 64 charges through resistor 65 to the point where the base of Q9 goes negative and turns Q9 on. Accordingly, an output step signal at terminal T will be produced, as indicated at 38 of waveform 66. This is the stepper signal of FIG. 3b.

Describing now the inhibiting action, in the absence of inhibiting signals the potentials at the inhibiting inputs B, C . . . L, M will be at ground. When a negative voltage is applied to any one of these inputs, the base of Q1 will go negative, turning Q1 on and bringing its collector to substantially ground. The collector of Q1 is connected to the base of Q3 through a voltage divider composed of resistors 67 and 68. These are selected so that when Q1 goes on, Q3 is turned off, since current will no longer be supplied through resistor 67 to the base of Q3. With Q3 off, the emitter of Q4 is disconnected from ground, so that the multivibrator action described above connot take place.

When the inhibiting signal is removed, the base of Q1 will return to ground, Q1 will be turned off, Q3 turned on, and multivibrator action started. In order to achieve a short rise time and assure the initiation of the multivibrator action, the collector of Q3 is coupled through capacitor 69 to the base of Q1. This results in a trigger action and gives a steep wavefront at the collector of Q3, once Q3 moves past the threshold of conduction. A lock-up action is supplied by the connection through resistor 52 from the collector of Q5 to the base of Q3. This insures that a clock cycle, once started, will be completed.

The single step action is produced by transistor Q2 connected as a pulse generator. Terminal R is normally held at —V through a high resistor 71, and capacitor 72 is charged. This charging results from the connection through resistor 73 to the base of Q2, and the connection of the latter through 74 to —V. The base of Q2 will be negative and Q2 will be on, but the negative potential of its base will be limited by base-emitter diode action, to say, —0.25 volt.

The input circuit to R may be normally open, as illustrated by the open switch 75, or normally negative.

When terminal R is brought to ground, as by closing switch 75, a positive transient is coupled through capacitor 72 to the base of Q2, driving the base above ground and turning Q2 off. The Q2 collector will then go negative and supply current to the base of Q3 through resistor 76, turning Q3 on and starting the multivibrator action.

In the meantime capacitor 72 will discharge toward —V, and when the base of Q2 goes negative to ground it is turned on. This brings the Q2 collector to ground and turns off Q3 to stop the multivibrator. The time constant of discharge of capacitor 72 can be made sufficiently short so that Q2 remains off for only a short time, usually an interval greater than $T_1$ and less than $T_2$ in FIG. 3c, so that Q3 can reopen at the end of one cycle.

When the input to R is removed, as by opening switch 75, capacitor 72 is allowed to recharge, ready for the next stepping.

Resistor 73 reduces the susceptibility of the circuit to false operation by input noise, since the noise must produce a current through the resistor sufficient to give an IR drop equal to the voltage required to turn Q2 off.

When single-step action is desired, one of the inhibit inputs B, C . . . L, M is supplied with a permanent negative voltage so that the multivibrator action is normally inhibited. This keeps Q3 normally open, with the pulse generated by Q2 overriding this inhibit for one cycle.

In the module of FIG. 3, as well as subsequent modules described hereinafter, the terminals are preferably brought out to a single edge of the module board, to facilitate connections thereto. However, in the drawings herein they are brought out to several edges to avoid drawing complexity and promote ready understanding.

Figure 4:
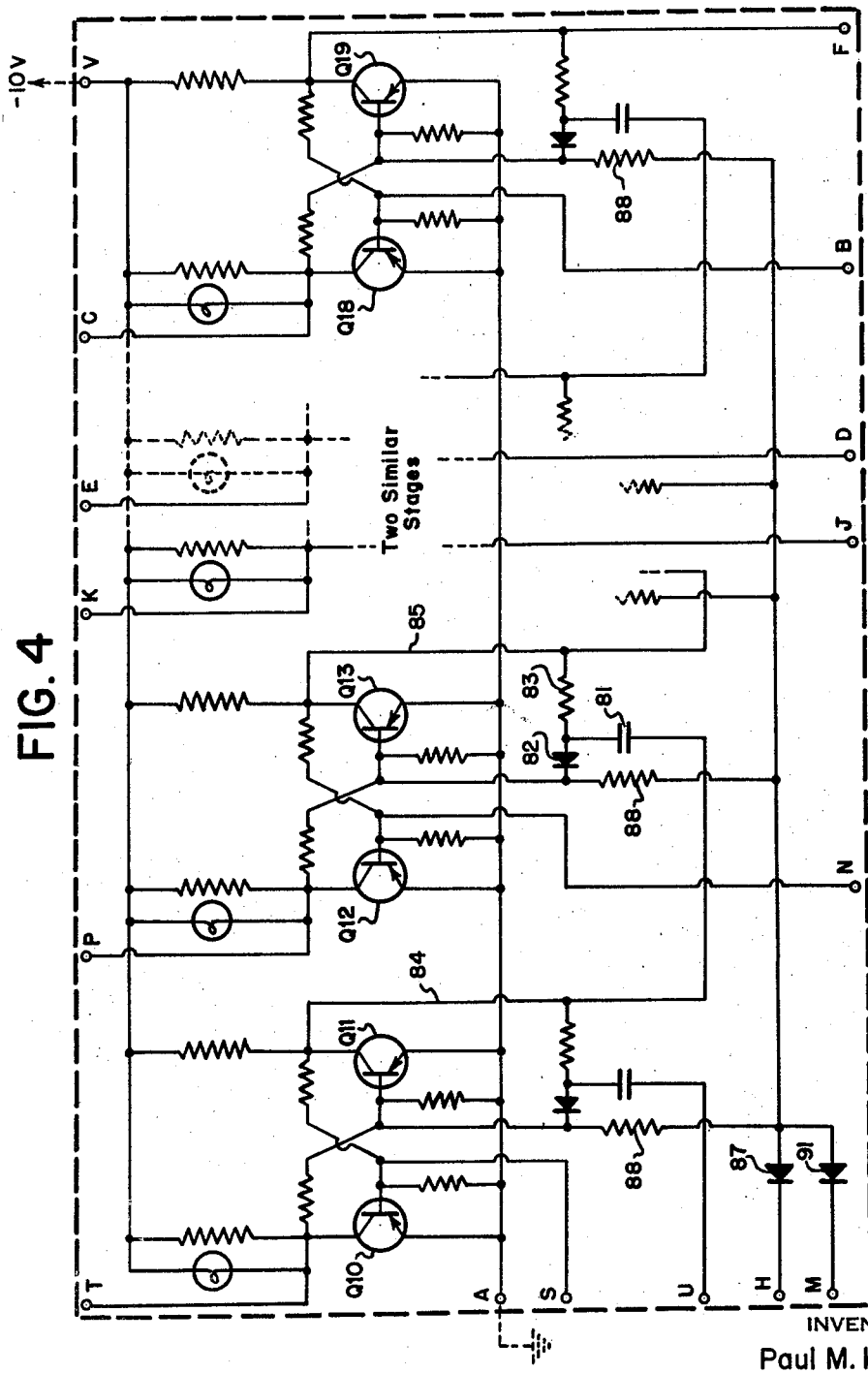

FIG. 4 is a circuit digram of the stepper module unit. As shown, it comprises five pairs of transistors, Q10-Q11, Q12-Q13 . . . Q18-Q19, each pair being connected as cross-coupled flip-flops and the several pairs interconnected to form a five-stage counter. By connecting the output back to the input, it will function as a ring counter. Or, two units may be operated in tandem to function as a decade ring counter, etc.

As seen in FIG. 4a, there are five outputs 0, 1, 2, 3, 4, corresponding to the five stages. There are also five "set" inputs whose function is to set the counter at any desired step. Normal step input signals are applied to input H. A "clear" signal to input M functions with a given set input to step the counter to the desired step.

In operation one and only one of the stages is in the "1" state at any given time, the other being in the "0" state (except that when being cleared for a jump action all stages are momentarily in the "0" state). It is assumed that a "1" output corresponds to an output at ground potential, and that a "0" output is a negative voltage substantially equal to −V. Considering the first stage including transistors Q10 and Q11, a "1" output at T corresponds to Q10 on and Q11 off. For a "0" output, Q10 would be off and Q11 on.

The stepper is advanced one step by changing the "1" flip-flop to "0" and causing the next flip-flop to go from a "0" to a "1." The coupling action is obtained by transmitting a positive-going transient from the "1" stage to the next through a capacitor-diode gate. One such gate coupling the first stage to the second comprises capacitor 81, diode 82 and resistor 83. The several stages and diode gates are similar so that only selected ones will be described. The positive-going transient is derived from the second transistor in each stage, that being the transistor whose collector goes to ground when the stage goes from a "1" to a "0."

With the first stage in the "1" condition, the potential of line 84 will be negative since Q11 will be off. With the next stage in the "0" state, transistor Q13 will be on and the potential of line 85 will be substantially ground. Capacitor 81 will then charge through resistor 83.

When the first stage is changed so the "0" condition, Q11 will be turned on and bring the potential of line 84 to substantially ground. Thus capacitor 81 will deliver a positive transient through diode 82 to the base of Q13, turning that transistor off. By multivibrator action between Q12 and Q13, Q12 will be turned on and produce a "1" output at terminal P.

This stepping action is initiated by a negative step pulse such as pulse 38 in FIG. 4b, applied to input H. Diode 87 thereupon conducts and applies a negative voltage to the bases of the second transistors in each stage, that is, to Q11, Q13 . . . Q19 through the respective resistors 88.

The first stage, which was in a "1" condition with Q11 off, will thereby be forced to the "0" condition, with Q11 on. Since the other stages are already in the "0" condition, the negative step pulse will have no effect.

However, when Q11 goes on, the aforesaid positive transient through capacitor 81 is in a direction to turn Q13 off. The length of the step pulse is made sufficiently short, compared to the duration of the transient so that the transient prevails and Q13 is turned off. This puts the second stage in the "1" state and delivers a "1" output at P.

It will therefore be seen that, upon the occurrence of a step pulse at H, whichever stage is a "1" will be changed to "0" and the next succeeding stage from "0" to "1."

When a jump action is to occur, all stages are momentarily cleared, that is, set to "0," and then the desired stage is set to "1."

This is accomplished by supplying a clear pulse such as shown by waveform 89 to input M. Diode 91 conducts and drives the bases of the second transistors in each stage negative, thereby turning all stage to the "0" condition. Since one of the stages will previously have been in the "1" state, the duration of the clear pulse is made greater than the set "1" transient, so that the clear pulse prevails. A negative set pulse such as shown by waveform 92 is then applied to one of the external set inputs S, N, etc. corresponding to the stage desired to be set to "1". This negative set pulse 92 immediately follows the clear pulse, and is supplied to the base of the first transistor in the selected stage, thereby turning that transistor on, and yielding a "1" output at the corresponding output terminal T, P, etc.

It will be noted that the capacitor-diode gate for stage 1 has its input at terminal "U". Also, the collector of the second transistor 19 of the last stage is brought out to terminal F. By connecting F to U, continuous ring stepping can be obtained. Or, additional stepper modules may be connected so as to obtain a greater number of steps when desired.

FIG. 5 illustrates the interconnections of two stepper modules to give an overall count from 0 to 9. As will be observed, terminal F of the first stepper is connected to U of the second, and F of the second is connected back to U of the first. The step inputs H are connected together, and also the clear inputs M.

The arrangement of FIG. 5 will be recognized as a decade counter. Two decade counters may be interconnected to give 100 steps, by connecting step 9 of the first decade counter to the step inputs H of the second decade counter through a coupler unit which advances the second decade counter one step for each ten steps of the first decade counter. The arrangement of decade counters to count any number of digits in a decimal system is known in the art and need not be described in detail.

Figure 6B:
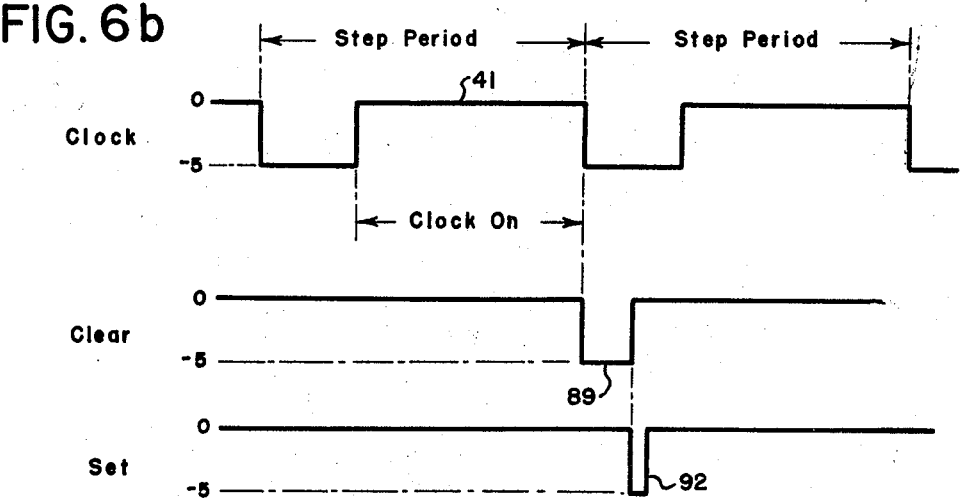

FIGS. 6, 6a and 6b illustrate a jump modular unit. More than one jump unit may be placed on a given module board, but only one will be described.

The jump unit responds to a given step number value and generates the necessary signals to place a new step number into the stepper. The clock signal is employed to prevent the jump signals from being generated until the step operation has been completed following which the jump is to take place. Also, provision is made to inhibit the generation of the jump signals so as to allow the stepper to advance to the next step.

As seen from FIG. 6a, two inputs D and H are provided to recognize the step number. With a continuous step sequence from 0 to 4 or 0 to 9, only one input is required and the other may be grounded. However, when two decades are arranged to count from 0 to 99, two inputs are required in order to recognize the status of each decade counter. More inputs could be provided for counting larger number of steps, but 100 steps suffices for most practical applications.

Input F is for the clock signal and input B for the inhibit signal. Two outputs J and K are provided to step the stepper to the desired new step. As in the case of the step number inputs, one output suffices for a continuous step counter, but two are provided for individual connection to two decade counters arranged to count from 0 to 99. Output E provides the "clear" signal to the stepper. An output C is provided which can be connected to a counter to count the number of jumps.

Referring to FIG. 6, Q21 is the inhibit stage. Q22 generates a signal when the correct step number for the jump and the clock signal are received. Q23 is a pulse generator for generating the clear pulse, and Q24 is a pulse generator for generating the set "1" pulse.

Step number and clock inputs D, H and F are connected through similar resistors 93 to the base of Q22. If any of these inputs is negative, Q22 will be on and its collector will be at ground potential. However, when all of the inputs are at ground Q22 will be turned off, causing the Q22 collector to go negative (assuming no inhibiting from Q21). Capacitor 94 will thereupon charge through the base of Q23 to −V potential. The collector of Q22 remains negative through the clock period shown at 41 in FIG. 6b and goes to ground at the end of the period due to the clock going off.

The positive-going transient at the collector of Q22 is transmitted through capacitor 94 to the base of Q23, thereby turning Q23 off and producing a negative pulse through diode 95 to output E. The duration of the transient is selected to produce an output pulse at E of the proper length for the clear signal 89 as previously described.

The Q23 pulse generator is similar to the Q8 pulse generator in FIG. 3, except for circuit constants, and the detailed operation need not be described again.

Since the Q23 collector is negative during the clear pulse interval, capacitor 96 will charge during this interval and, upon termination of the clear pulse, a positive transient will be delivered to the base of Q24. A second negative pulse will then be delivered by Q24 to outputs J and K, corresponding to the set pulse 92 of FIG. 6b. The constants associated with pulse generator 24 are selected to give a set pulse which is substantially shorter than the clear pulse.

In order to facilitate counting of jumps, the collector of Q22 is made available at output C.

The inhibiting of the jump signal outputs is obtained by applying ground potential to input B. Q21 will thereupon be turned off, and the negative collector will apply a negative potential through resistor 97 to the base of Q22. This prevents Q22 from being turned off by terminals D, H and F all going to ground, thereby inhibiting the generation of the output pulses. The inhibit signal to B is applied before the beginning of the clock signal 41 in order to produce this inhibiting action.

Figure 7:
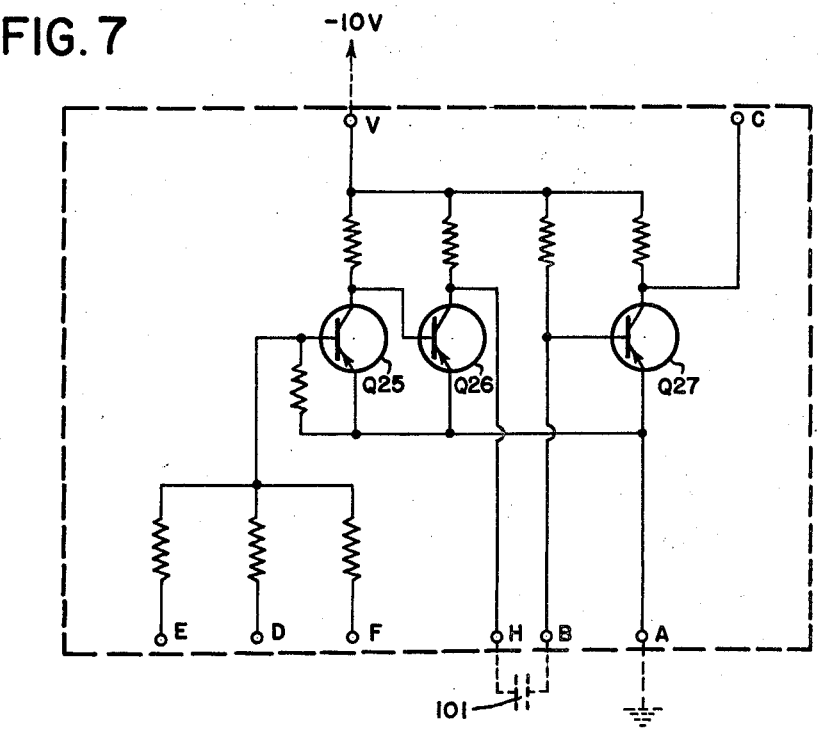

FIGS. 7, 7a and 7b illustrate the delay module unit. Several delay units may be placed on a given module, but only one is shown.

The delay unit responds to a given step number and generates a pulse which is applied to the timer unit (FIG. 3) in order to stop the timer oscillator for a fixed time period. The unit includes inputs D and E for recognizing the step number at which the delay is to be introduced, and input F for the clock signal. The timer inhibit signal is from output C.

FIG. 7b shows a clock waveform 41 with a dotted pulse 38′ corresponding to the step at which the delay is to be introduced. The delay is to start at 98 and continue to 99. 98 corresponds to the beginning of the clock signal succeeding step pulse 38′. Due to the interval therebetween, the stepper will have had time to perform its action, and step signals will be present at inputs D and E at the time the clock signal is applied to F. Two inputs D and E are provided for the step number as described in connection with the jump unit. When all three inputs E, D, F are at ground potential, transistor Q25 will be turned off and its collector will be negative.

In this unit it is desired to inhibit the timer oscillator during the generation of the corresponding clock signal, so that a direct-coupled transistor stage Q26 is provided for inversion. Consequently Q26 will be turned on and its collector will be at ground potential immediately following the beginning of the clock pulse.

Transistors Q26 and Q27 are connected in the manner described for Q22 and Q23 of FIG. 6 so as to function as a pulse generator. However, since the desired delay may vary for different applications, here an external capacitor 101 is employed so that its value can be selected to produce the required delay.

Transistor Q27 will be cut off at the beginning of the delay time and turned on at the end of the time as determined by the value of capacitor 101, generating a delay signal as shown by waveform 102. In effect, the clock pulse is stretched as shown at 100. The output at C may be supplied to any one of the timer inhibit inputs and will stop the timer oscillator as described before.

Figure 8:
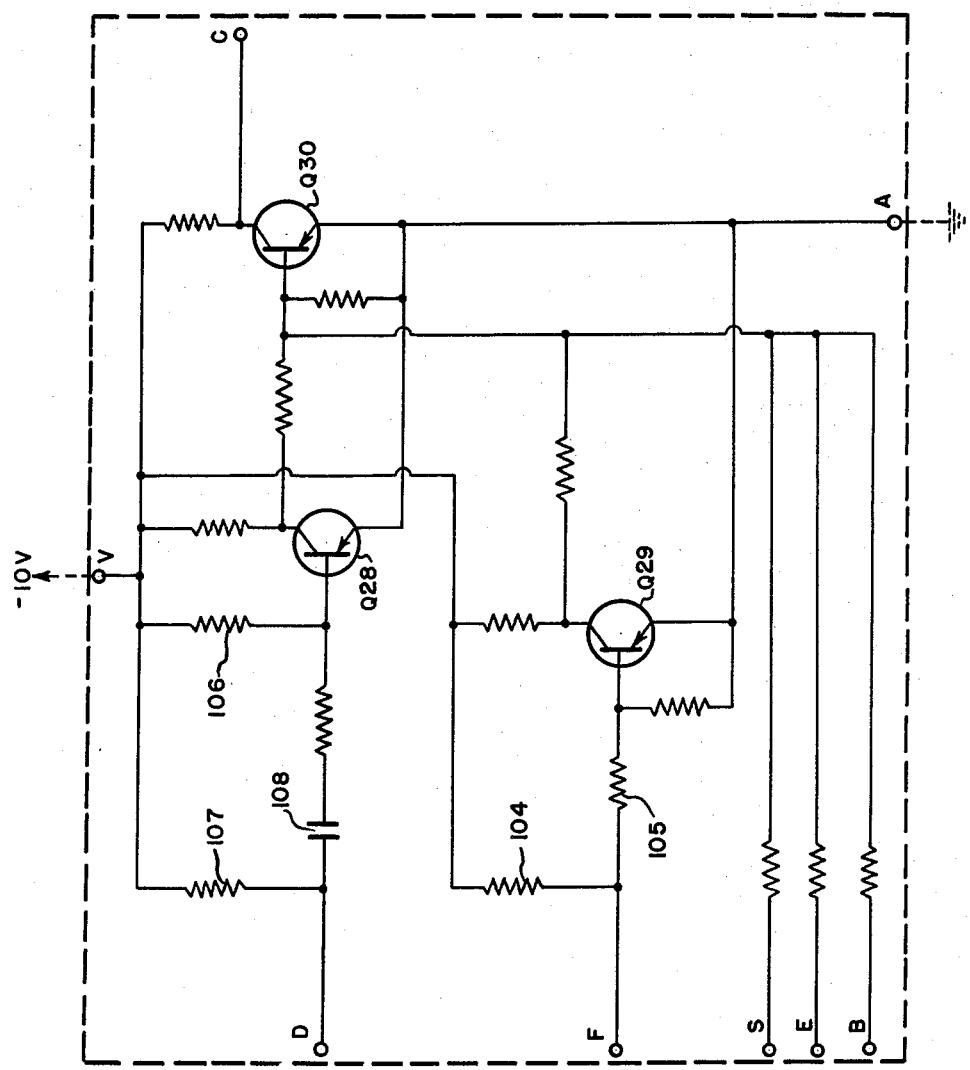
FIGS. 8, 8a and 8b are similar illustrations for a Wait modular unit.
Figure 8A:
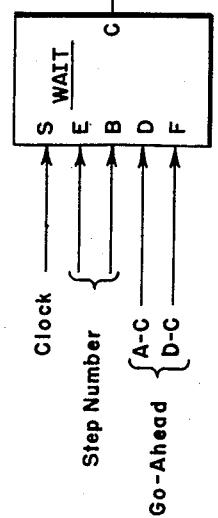
Figure 8B:
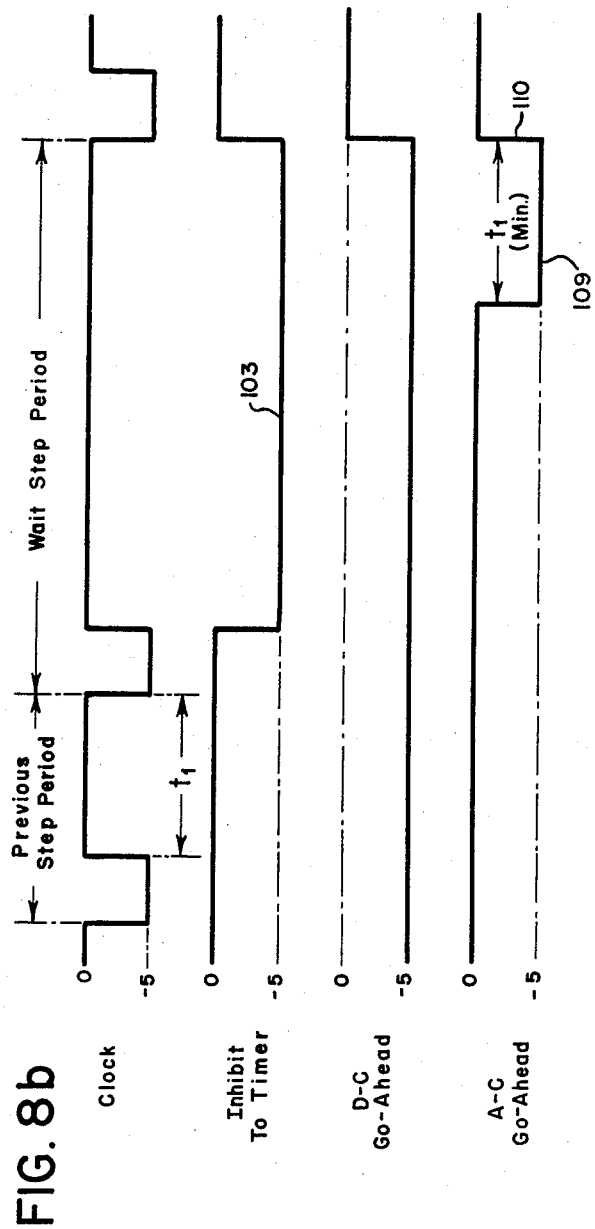

FIGS. 8, 8a and 8b show the Wait unit. This unit responds to a given step number from the stepper at inputs B and E, as described for the Jump and Delay units, upon the occurrence of a clock signal at input S. The output at C is a negative-going signal which may be supplied to one of the inhibiting inputs of the timer to stop the timer oscillator. Provision is made for two types of Go-ahead signals, one of which is a D.-C. signal at ground potential and the other a transient or A.-C. signal. In the first, the D.-C. ground potential will over-ride the inputs producing the inhibit action, and in the second a positive-going transient provides the over-riding action.

In many applications either type of Go-ahead signal may be used. However, where the signal may be produced in advance of the step at which the wait would ordinarily take place, the D.-C. input will ordinarily be used. Also, where the signal is of uncertain duration, as when produced manually, the A.-C. input may be preferable to avoid the possibility that the wait step will be reached again before the Go-ahead signal is removed.

Referring to FIG. 8, Q30 has its input connected through resistors to terminals B, E and S, and generates a negative inhibiting output at C, as shown by waveform 103, when the inputs are at ground potential. This functions in the manner described for Q22 of FIG. 6.

Q29 is in the D.-C. Go-ahead stage. With the input circuit to F open (or negative), a negative potential from −V and resistor 104 will be applied through resistor 105 to the base of Q29, thereby holding Q29 on. Accordingly, its collector will normally be substantially at ground potential and will not inhibit the operation of Q30. However, when input F is grounded, Q29 is turned off and the negative potential of its collector will drive the base of Q30 negative, thereby turning on Q30 and terminating the inhibit signal 103.

Since the production of clock and step signals by the timer are then resumed, the stepping action will remove one or both of the inputs to B and E, so that it is unnecessary for the Go-ahead signal to persist longer. However, if it is desired to inhibit the action of the Wait unit until a step sequence has repeated several times, the D.-C. Go-ahead may be maintained for the desired length of time and removed when it is desired to introduce the Wait action at the next occurrence of the step number supplied to the unit.

The A.-C. Go-ahead is supplied through input D to Q28 which functions as a pulse generator similar to the Q2 stage of the Timer (FIG. 3). Normally input D is negative or an open circuit. The base of Q28 is negative due to the connection through resistor 106 to −V, and Q28 is conducting. This applies ground potential from its collector to the base of Q30, allowing Q30 to produce an inhibiting signal if the inputs S, E and B are at ground. However, if ground potential is applied to input D, a positive transient is applied through capacitor 108 to the base of Q28, turning that transistor off and applying a negative potential to the base of Q30. This turns Q30 on, thus removing the inhibiting signal at output C.

The duration of the interval during which Q28 keeps

Q30 on is determined by the time constant of the discharge of capacitor 108, and is made sufficiently long to allow the timer to generate at least the next step signal so as to remove the preceding step signals at inputs B and E.

Before another A.-C. Go-ahead signal can be effective, capacitor 108 must be allowed to charge. This may be accomplished by opening the input circuit to D, or bringing D to a negative potential. This is indicated in FIG. 8b, where 109 indicates a minimum interval during which a negative signal should be applied (or the input to D broken) before a new go-ahead can be effected at 110.

Figure 9:
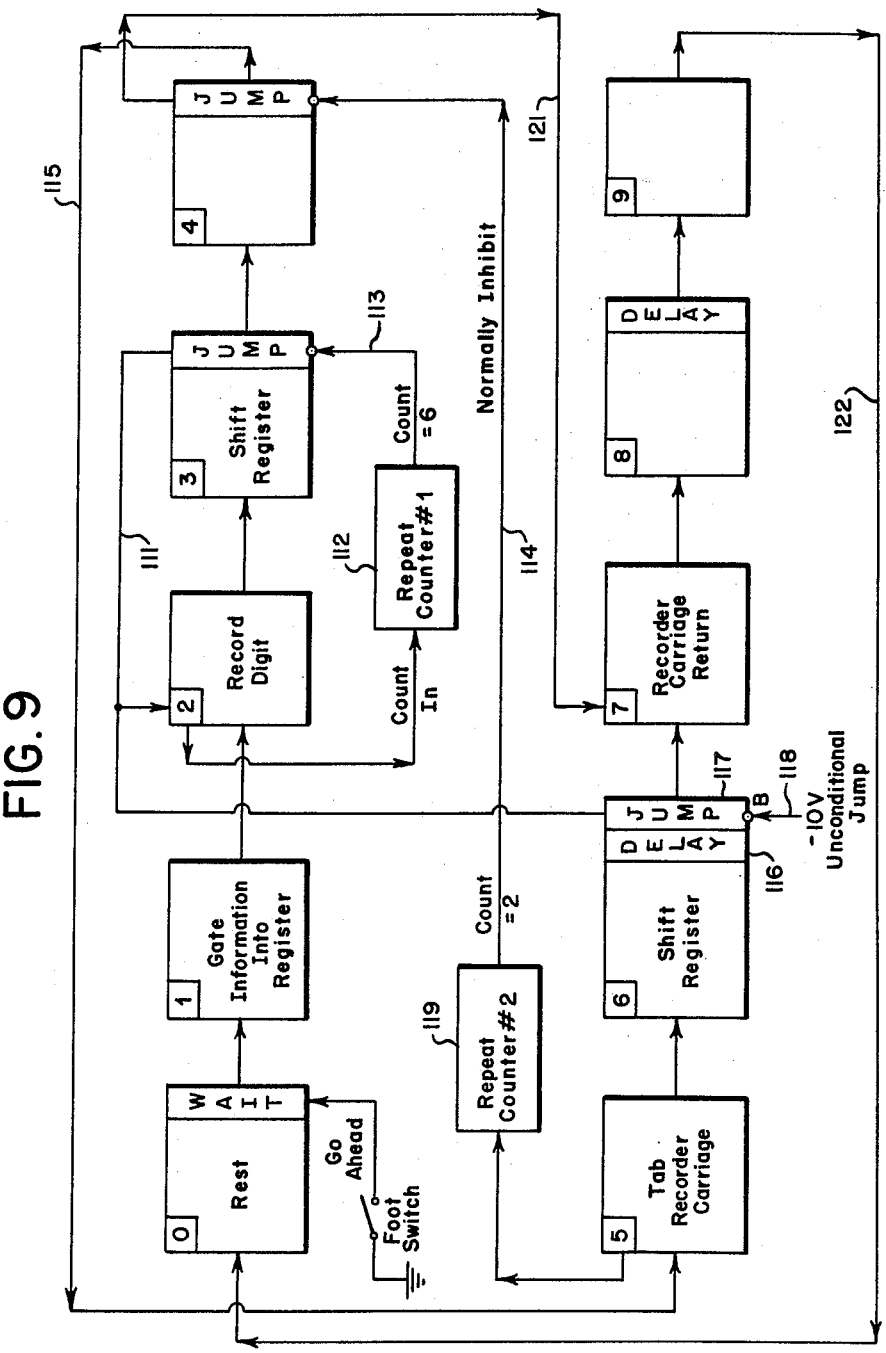
FIGS. 9 and 10 illustrate different arrangements of the modular units to perform different control functions.
Figure 10:
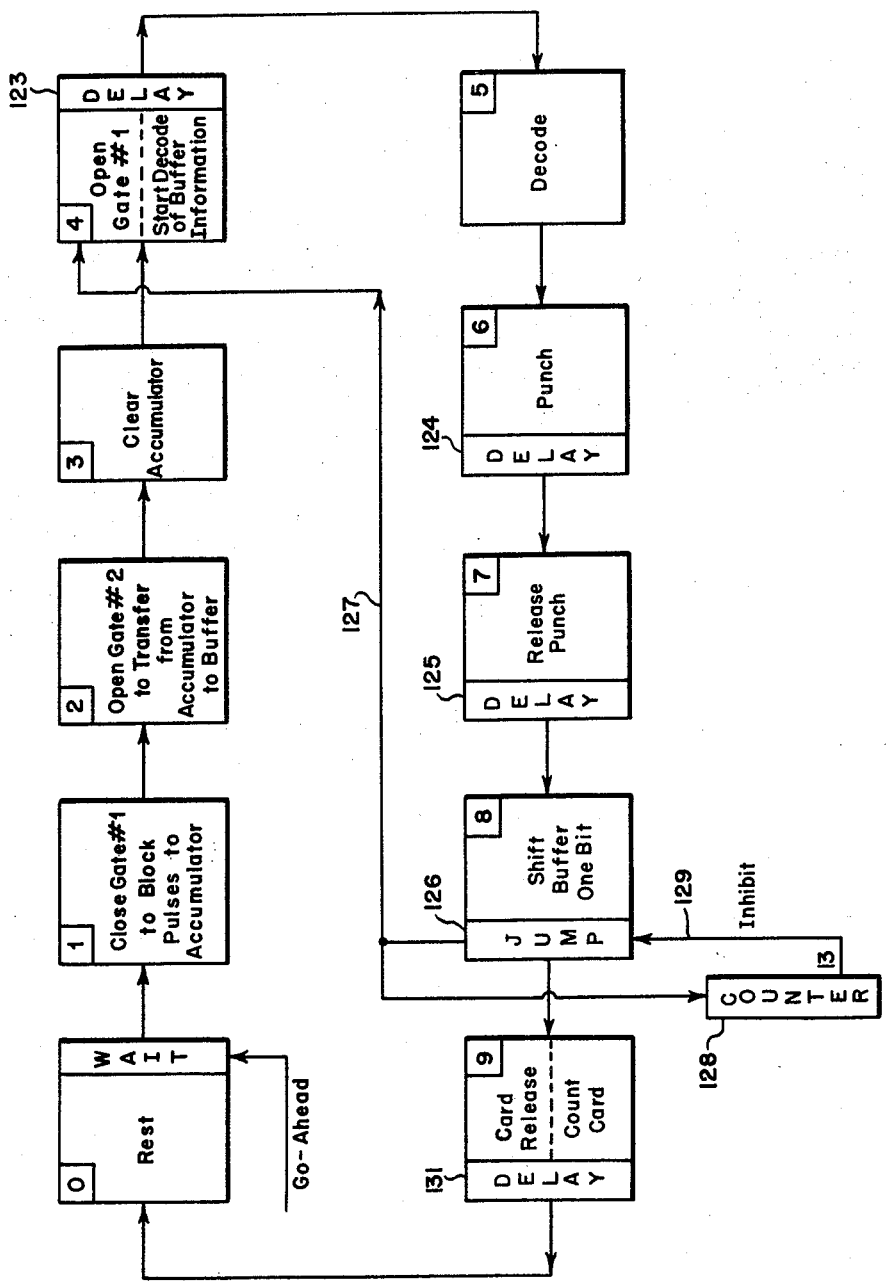

It will be appreciated from the foregoing description of FIGS. 1 and 2, and the description of the specific modular units, that the units can be interconnected to give many different sequences to fit a wide variety of control applications. FIGS. 9 and 10 give two more examples.

Referring to FIG. 9, this system was designed to control the recording of digits from a computer. Three series of six digits each were to be recorded by a typewriter. The computer contained a shift register capable of receiving six digits and shifting them in sequence to provide a digital output in sequence to be recorded. Overall, it was required to gate pulses corresponding to the first six digits into the shift register, record each digit in succession and shift the register between digits, and then repeat the operation for the next 6-digit number and again for the third 6-digit number. The typewriter was to be tabbed to different positions for different 6-digit numbers, and eventually the carriage returned to its initial position ready for another cycle.

The operation is initiated by a foot switch, and step "0" is simply a Wait with a Go-ahead signal obtained from a foot switch, as indicated. When the Go-ahead signal is produced, the system proceeds to step 1, and the step 1 output is used to gate information into the register, as indicated. At step 2 the first digit is recorded. At step 3 the register is shifted so as to produce an output corresponding to the second digit. To record the second digit, a Jump unit is actuated by step 3, as indicated, and the system goes back to step 2, as indicated by line 111, so as to record the second digit.

The sequence of steps 2 and 3 is repeated until the repeat counter 112 has counted the necessary number of times, whereupon the counter supplies an inhibiting signal through line 113 to the Jump unit. This allows stepping to step 4. The step 4 output is supplied to a Jump unit as indicated, but the jump action is normally inhibited by a signal in line 114. Thus, when step 4 is reached the first time, operation proceeds in normal stepping sequence to step 5, as indicated by line 115. The output at step 5 is used to tab the recorder carriage.

At step 6, the register is shifted to yield an output corresponding to the first digit in the second 6-digit number. Since the tabbing of the carriage takes more time than the operation of the shift register, a delay 116 is introduced at step 6. A jump 117 is also introduced at step 6 so that, after the delay, operation jumps back to step 2, and steps 2 and 3 are repeated as described above so as to record the second series of six digits.

In this particular operation it is desired for jump 117 to take place after each occurrence of step 6, so that an unconditional jump suffices. This is obtained by applying a negative voltage through line 118 to the inhibit input B thereof, so that the jump is never inhibited.

After typing out the second 6-digit series, another tab operation is produced at step 5. The action is then repeated for the third 6-digit series. Counter 119 counts the number of tab operations and after two operations its normal inhibiting output in line 114 is removed, thereby allowing the jump at step 4 to take place after the recording of the third 6-digit group has taken place. At this time the jump unit sets the stepper to step 7, as indicated by line 121. At step 7, the typewriter carriage is returned to its initial condition. A certain amount of time is required for this to take place, and accordingly a delay is introduced at step 8, as indicated.

This completes the desired control sequence and the system is ready to be returned to its 0-step condition. This could be accomplished by incorporating a jump at step 8 to jump back to 0. However, since a 9th step is available (with two stepper units in tandem), the system is stepped quickly through step 9 and back to step 0, as indicated by line 122. The system is then in readiness to repeat the operation on the next closure of the foot switch.

The manner in which the units are interconnected to give the action described in FIG. 9 will be clear from the example of FIGS. 1 and 2.

FIG. 10 shows a control system for a somewhat similar purpose, but in which the control sequence differs materially. Here it was desired to punch cards in accordance with the output of a computer. The computer contained an accumulator which accumulated the pulse data, and the data was transferred to a buffer for recording. The output of the buffer was decoded and the cards punched in accordance with the decoded information.

This control unit also is designed to be put into operation upon receipt of a go-ahead signal. Accordingly, step 0 includes a Wait unit. Upon receipt of the go-ahead signal, step 1 takes place and the output at step 1 is used to close a gate No. 1 which blocks further supply of data pulses to the accumulator. At step 2, a gate No. 2 is opened to transfer the pulse data from the accumulator to the buffer. At step 3 the accumulator is cleared, ready to receive new data. At step 4, gate No. 1 is opened to allow the accumulator to accumulate new data, and decoding of the buffer information begins.

The decoding involved the actuation of relays, and accordingly a delay 123 is introduced at step 4. The system then steps through decoding step 5 to step 6, where a punch is actuated in accordance with the decoded information. Rather than introducing the relay at step 4 to provide time for decoding, it could be introduced at step 5 instead. The punching operation also required a time greater than the step interval, so delay 124 is introduced at step 6. At the end of this delay, operation proceeds to step 7 where the punch is released. This required some delay also, and delay 125 is introduced.

At step 8, the buffer is shifted one bit, and the system is ready for decoding the second bit. Consequently, a jump 126 is introduced to jump back to step 4, as indicated by line 127. A counter 128 counts the number of jumps, and after the required number (13 in this case) supplies an inhibiting signal through line 129 to jump 126, thereby allowing operation to proceed to step 9. At this step the output actuated a card release and a card counter. This took a time greater than the step interval so a delay 131 is introduced. After this delay, operation returns to step 0, ready for the next go-ahead signal.

The invention has been described in connection with specific embodiments of the modular control units, and several examples of specific combinations of the control units to effect particular control sequences have been given to illustrate the usefulness thereof. While the specific control units described have features which are believed to be particularly advantageous, it will be understood that they may be modified or elaborated as meets the requirements of the intended applications.

I claim:

1. A modular electronic control circuit which comprises a timer module including means for producing a series of spaced stepper pulses, a stepper module having a plurality of step stages for producing control signal outputs at the corresponding steps and means for stepping from one stage to the next successively in sequence in response to successive stepper pulses applied thereto from the timer module, said stepper module including means for individually setting the stages to different steps in response to corresponding step set signals, a jump module including means for producing a step set signal output in response to a selectable control signal output from the stepper module means and means for inhibiting the production of the step set signal output in response to a jump inhibiting signal, and connections between said timer, stepper and jump modules for producing stepping and jump actions in a desired sequence.

2. A modular electronic control circuit which comprises a timer module including means for producing a series of spaced stepper pulses and means for inhibiting the production of the stepper pulses in response to timer inhibiting signals applied thereto, a stepper module having a plurality of step stages for producing control signal outputs at the corresponding steps and means for stepping from one stage to the next successively in sequence in response to successive stepper pulses applied thereto from the timer module, said stepper module including means for individually setting the stages to different steps in response to corresponding step set signals, a jump module including means for producing a step set signal output in response to a selectable control signal output from the stepper module and means for inhibiting the production of the step set signal output in response to a jump inhibiting signal, and connections between said timer, stepper and jump modules for producing stepping and jump actions in a desired sequence.

3. A modular electronic control circuit in accordance with claim 2 including a delay module including means for producing a timer inhibiting signal in response to a selectable control signal output from the stepper module, and connections between the delay module and the timer and stepped modules for introducing a delay at a desired step.

4. A modular electronic control circuit in accordance with claim 2 including a wait module including means for producing a timer inhibiting signal in response to a selectable control signal output from the stepper module and means for terminating the timer inhibiting signal in response to a go-ahead signal applied thereto, and connections between the wait module and the timer and stepper modules for producing a wait action at a desired step.

5. A modular electronic control circuit in accordance with claim 2 in which said timer module includes means for producing a series of clock pulses timed to occur between the stepper pulses and means for inhibiting the production of the clock pulses in response to said timer inhibiting signals, and in which said jump module includes means for inhibiting the production of a step set signal output in the absence of a clock pulse, and a connection for supplying the clock pulses from the timer to the jump module.

6. A modular electronic control circuit in accordance with claim 5 which includes a delay module including means for producing a timer inhibiting signal in response to the simultaneous occurrence of a selectable control signal output from the stepper module and a clock pulse from the timer module, connections from the timer and stepper modules to the delay module for supplying thereto clock pulses and a control signal at a desired step, and a connection from the delay to the timer module for supplying a timer inhibiting signal thereto.

7. A modular electronic control circuit in accordance with claim 5 including a wait module including means for producing a timer inhibiting signal in response to the simultaneous occurrence of a selectable control signal output from the stepper module and a clock pulse from the timer module, the wait module including means for receiving a go-ahead signal and means responsive thereto for terminating the timer inhibiting signal, connections from the timer and stepper modules to the wait module for supplying thereto clock pulses and a control signal at a desired step, and a connection from the wait to the timer modules for supplying a timer inhibiting signal thereto.

8. A modular electronic control circuit which comprises a timer module including means for producing a series of spaced stepper pulses and a series of clock pulses timed to occur between the stepper pulses, means for inhibiting the production of the stepper and clock pulse signals in response to timer inhibiting signals applied thereto, and a single-step pulse generator responsive to a corresponding input signal for overriding the inhibiting means and allow the production of a single pair of stepper and clock pulses; a stepper module having a plurality of bistable multivibrator step stages each producing a control signal output at the corresponding step in one of the bistable states thereof, means for actuating the stages to said one state successively in sequence in response to successive stepper pulses applied thereto, means for clearing the stages to the other state thereof in response to an applied step clear signal, and means for individually setting any stage to said one state in response to a corresponding applied step set signal; a jump module including input circuits for receiving a selectable control signal output from the stepper module and the clock pulse signal from the timer module, means for producing step clear and step set signals in response to the simultaneous occurrence of control and clock pulse signals at the inputs thereof, the step clear and step set signals being produced upon the termination of the clock pulse, and means for inhibiting the production of the step clear and step set signals in response to a jump inhibiting signal applied thereto; and connections for supplying stepper pulses from timer to stepper modules, clock pulse signal from timer to jump modules, a control signal from a step of the stepper moduler to the jump module, the step clear signal from the jump to stepper modules and the step set signal to a stage thereof, said connections producing stepping and jump actions in a desired sequence.

9. A modular electronic control circuit in accordance with claim 8 including a delay module including input circuits for receiving a selectable control signal output from the stepper module and the clock pulse signal from the timer module, and means for producing a timer inhibiting signal in response to the simultaneous occurence of control and clock pulse signals at the inputs thereof; and connections for supplying the clock pulse signal from timer to delay modules, a control signal from a step of the stepper module to the delay module, and the timer inhibiting signal from delay to timer modules, said connections introducing a delay at a desired step.

10. A modular electronic control circuit in accordance with claim 9 including a wait module including input circuits for receiving a control signal from the stepper module and the clock pulse signal from the timer module, means for producing a timer inhibiting signal in response to the simultaneous occurrence of control and clock pulse signals at the inputs thereof, an input circuit for receiving a go-ahead signal, and means responsive to a received go-ahead signal for terminating the timer inhibiting signal; and connections for supplying the clock pulse signal from timer to wait modules, a control signal from a step of the stepper module to the wait module, and the timer inhibiting signal from the wait to timer modules, said connections introducing a wait at a desired step which is terminable by a go-ahead signal to the wait module.

11. A timer module for a modular electronic control circuit which comprises an oscillator, pulse generating means for receiving the oscillator output and generating a series of spaced stepper pulses in synchronism therewith and a series of clock pulses timed to occur between the step pulses, output terminals supplied with said stepper and clock pulses respectively, a plurality of input circuits for receiving timer inhibiting signals, and inhibiting means responsive to an inhibiting signal in any of said input circuits for inhibiting said oscillator.

12. A timer module in accordance with claim 11 including an input circuit for receiving a single-step input signal, a pulse generator for generating a pulse in response to said signal, and means for utilizing said pulse to override the inhibiting action of said inhibiting means and allow the oscillator and pulse generator means to produce a pair of stepper and clock pulses.

13. A timer module for a modular electronic control circuit which comprises power supply input terminals, a pair of transistors having collectors connected through load resistors to one power supply terminal, the emitter of one transistor being connected to the other power supply terminal and the emitter of the other transistor being connected thereto through the collector-emitter path of an inhibiting transistor, interconnections between the bases and collectors of the pair of transistors to form an astable multivibrator when said inhibiting transistor is conducting, stepper and clock transistor pulses generators connected to receive the multivibrator output and adapted to generate respective series of stepper and clock pulses with the clock pulses occurring between the stepping pulses, output terminals supplied with said stepper and clock pulses respectively, an input circuit for receiving a timer inhibiting signal, and means responsive to a received inhibiting signal for rendering said inhibiting transistor substantially non-conducting and thereby inhibiting the multivibrator.

14. Apparatus in accordance with claim 13 in which the inhibiting transistor is in the emitter circuit of the multivibrator transistor which is non-conducting during the latter part of a step cycle in which a pair of stepping and timing pulses is produced.

15. Apparatus in accordance with claim 13 including an input circuit for receiving a single-step input signal, a transistor step pulse generator for producing a single pulse in response to an application of said single-step input signal, and connections from the step pulse generator to said inhibiting transistor for rendering the inhibiting transistor conducting for at least the duration of said single pulse, the duration of said single pulse being less than one cycle of operation of the multivibrator.

16. A jump module for an electronic control circuit which includes a stepper unit having a plurality of step stages for producing control signal outputs at the corresponding steps, means for stepping from one stage to the next successively in sequence in response to successive stepper pulses applied thereto, and means for individually setting the stages to different steps in response to corresponding step set signals, said jump module comprising an input circuit for receiving a selectable control signal output from said stepper unit, means for producing a step set signal output in response to said control signal, an input circuit for receiving a jump inhibiting signal, and means responsive to said jump inhibiting signal for inhibiting the production of said step set signal output.

References Cited by the Examiner

UNITED STATES PATENTS

| 2,824,961 | 2/58 | Paivinen | 328—41 X |
| 2,964,657 | 12/60 | Page. | |
| 2,999,947 | 9/61 | Dean. | |
| 3,005,963 | 10/61 | Emile. | |
| 3,026,427 | 3/62 | Chisholm. | |
| 3,040,189 | 6/62 | Cramer. | |
| 3,059,128 | 10/62 | Cramer. | |

ARTHUR GAUSS, *Primary Examiner.*